United States Patent
Hesse et al.

(10) Patent No.: US 6,926,483 B2
(45) Date of Patent: Aug. 9, 2005

(54) JOINING ASSEMBLY FOR JOINING A PAIR OF STRUCTURAL MEMBERS

(75) Inventors: Wolfgang Hesse, Rietberg (DE); Rainer Süssenbach, Steinhagen (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 10/887,959

(22) Filed: Jul. 9, 2004

(65) Prior Publication Data

US 2005/0019129 A1  Jan. 27, 2005

(30) Foreign Application Priority Data

Jul. 22, 2003  (DE) ..................................... 203 11 263 U

(51) Int. Cl.[7] .............................................. F16B 13/04
(52) U.S. Cl. .......................... 411/36; 411/21; 411/37; 411/17; 411/71; 411/72; 411/52; 411/453; 411/62
(58) Field of Search ............................... 411/36, 21, 37, 411/17, 29, 71, 72, 55, 52, 453, 62

(56) References Cited

U.S. PATENT DOCUMENTS

| | | | | |
|---|---|---|---|---|
| 1,036,825 A | * | 8/1912 | Garchey .................. | 411/257 |
| 2,075,411 A | * | 3/1937 | Von Mertens ............ | 411/453 |
| 2,918,841 A | * | 12/1959 | Poupitch .................. | 411/36 |
| 3,283,641 A | * | 11/1966 | Wagner .................... | 411/36 |
| 3,942,407 A | * | 3/1976 | Mortensen ................ | 411/36 |
| 4,449,877 A | * | 5/1984 | Kessler .................... | 411/80.5 |
| 4,776,737 A | * | 10/1988 | Wollar ..................... | 411/38 |
| 4,878,791 A | * | 11/1989 | Kurihara et al. ......... | 411/55 |
| 5,030,051 A | * | 7/1991 | Kaneko et al. ........... | 411/55 |
| 5,246,323 A | | 9/1993 | Vernet et al. | |
| 5,636,953 A | * | 6/1997 | Jaeger et al. ............. | 411/82.5 |
| 6,254,325 B1 | * | 7/2001 | Kun ......................... | 411/38 |

FOREIGN PATENT DOCUMENTS

EP   0270913   6/1988

* cited by examiner

Primary Examiner—Robert J. Sandy
Assistant Examiner—David Reese
(74) Attorney, Agent, or Firm—Seyfarth Shaw LLP

(57) ABSTRACT

A joining assembly for joining a pair of structural members, comprises a bolt having a thread and a nut-like blind rivet adapted to be inserted into mounting holes of the structural members and to be threadingly engaged to each other. One of the mounting holes is made of resiliently deformable material and comprises a base member including a bore for receiving the thread of the bolt and having an outside provided with a plurality of threads which are similar in number to the corners of the polygonal mounting hole, such that when the bolt is threadingly engaged into the bore of the blind rivet the base member is folded whereby the threads have parts of their flanks pressed against one of the structural members.

20 Claims, 2 Drawing Sheets

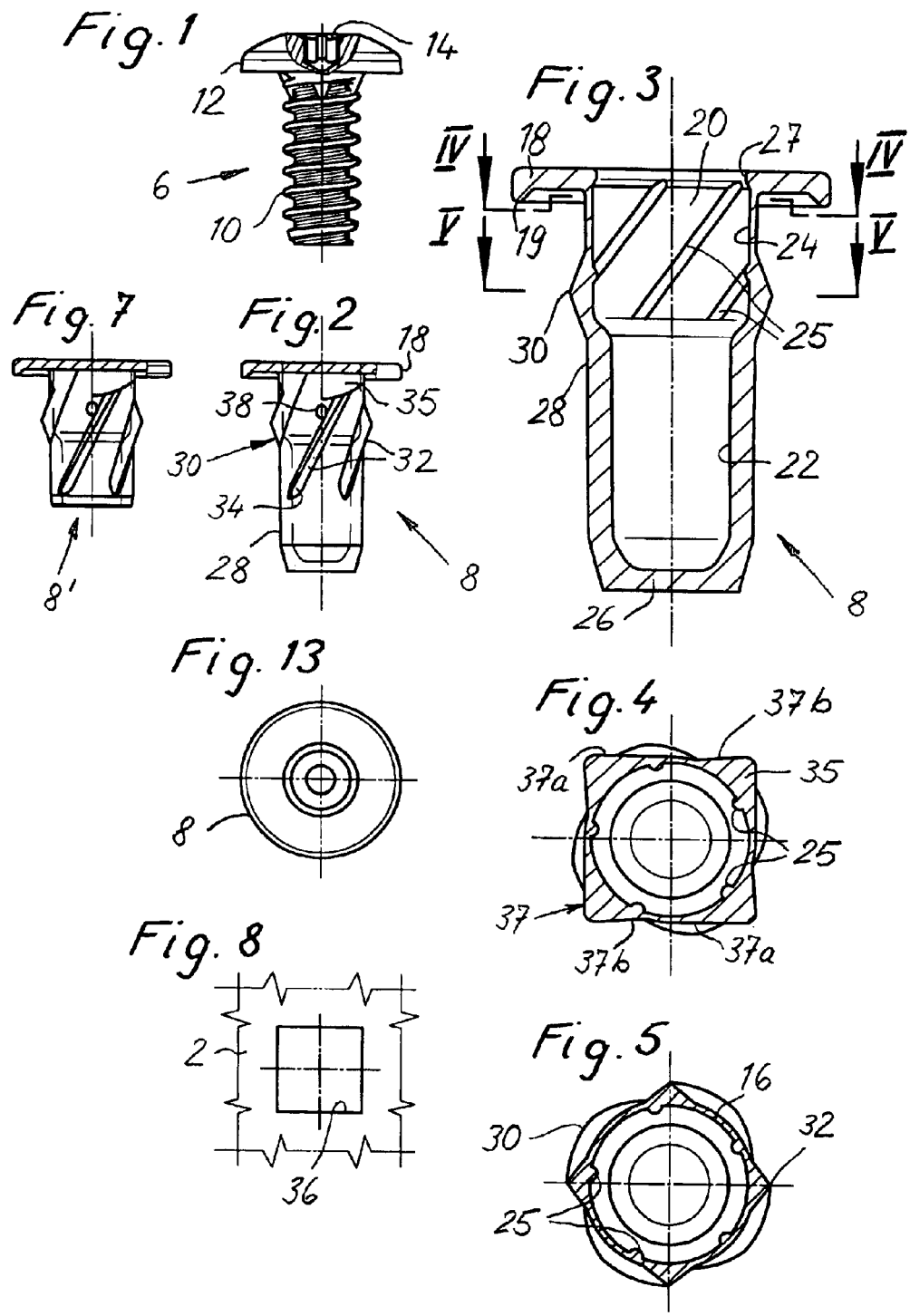

JOINING ASSEMBLY FOR JOINING A PAIR OF STRUCTURAL MEMBERS

BACKGROUND OF THE INVENTION

The present invention relates to a threaded joining assembly for joining a pair of structural members. The joining assembly includes a bolt and nut-like blind rivet which are adapted to be inserted into mounting holes of said pair of structural members and to be threadingly engaged to each other for joining said pair of structural members.

Such threaded bolt assemblies are known in the art. When the bolt of such a joining assembly is being threadingly engaged into the nut-like blind rivet made of a resiliently deformable material in order to join the structural members, a resiliently deformable portion of the blind nut is expanded to form a rivet bead which engages the adjacent structural member so as to join the structural members in an axial direction. If the rivet bead which is basically in the shape of an annular flange is relatively soft, the structural members may not be joined properly. If however the rivet bead is relatively hard, the rivet bead may become brittle so as to detrimentally affect the joining assembly. Generally spoken, the loading capability of such joining assembly is limited.

German Utility Model GM 201 12 171.9 of applicant discloses a threaded joining assembly comprising a bolt and a nut-like blind rivet comprising a sleeve-shaped lower part and a sleeve-shaped upper part of a wall thickness such that the lower part is highly flexible. The upper and lower parts are integrally connected by a shoulder portion of reduced wall thickness so that when the bolt is being threadingly engaged into the lower part of the blind rivet the wall of the upper part rolls along the outside of the lower part thereby to fold a rivet bead. This results in a reliable, highly resistant and durable joint between the structural members. A certain drawback of this threaded joining assembly is that the nut-like blind rivet is recessed due to the shoulder-shaped portion thereof which makes it difficult to manufacture the blind rivet by injection molding. As a result only a relatively limited number of blind rivets can be manufactured simultaneously, and injection molding of the blind rivets becomes relatively time consuming. In order to obtain threaded connection assemblies of sufficient strength, relatively large dimensions of the parts involved may be necessary.

SUMMARY OF THE INVENTION

It is a primary object of the present invention to provide a threaded joining assembly for joining a pair of structural members, which joining assembly comprises a bolt and a nut-like blind rivet and provides for a reliable, highly resistant and durable joint of the structural members.

It is a further object of the present invention to provide such a threaded joining assembly which is of relatively simple design and economical manufacture.

A further object of the invention is to provide such a threaded joining assembly which is of relatively small dimensions.

In the threaded joining assembly of the invention the mounting hole of one of the structural members is formed as a polygonal hole, preferably a square hole. The blind rivet comprises a cylindrical base member having an outside provided with a multiple stud helix means, preferably a four stud helix means. The number of the threads of the multiple stud helix is the same as the number of the corners of the polygonal mounting hole. Furthermore, the dimensions of the helix means and the dimensions of the polygonal mounting hole are matingly shaped such that the multiple threads of the helix means when assembled substantially fill the corners of the polygonal mounting hole. Relative rotational movements between the blind rivet and the associated structural member are prevented thereby. When the bolt during assembly is being threadingly engaged into the bore of the blind rivet, the base member and the helix means of the deformable blind rivet are folded so that the threads of the helix means have parts of their flanks pressed against the associated structural member. A reliable, highly resistant, and durable joint of the structural members results therefrom.

Therefore, the rivet "bead" of the blind rivet is being formed by the helix means in the threaded joining assembly of the present invention. Since the folding area of the joining assembly of the invention is radially remote from the central axis as compared to arrangements of the prior art, the threaded joining assembly of the invention while using reduced dimensions of the bolt and the blind rivet including the mounting holes enables to obtain a joining strength comparable to that of joining arrangements of increased dimensions as used in the prior art. Since the blind rivet of the invention does not have any recessed portion, manufacture thereof is relatively simple. As a result the blind rivet may be readily injection molded from plastic material by using simple plate-shaped tools. For removing the blind rivet from the plate-shaped tools, linear ejection of the blind rivet is possible, with the linear ejection resulting in automatic rotation of the helical threads for removal thereof from the plate-shaped tools.

Preferably the helix means comprises V-shaped threads having a lead angle exceeding its self-locking angle. During assembly the blind rivet can be axially pressed into the polygonal mounting hole of the respective structural member; as a result the blind rivet is rotated due to great lead of the helix means. When the respective structural member is of a sufficient thickness, the threads of the helix and the polygonal mounting hole are clampingly engaged to each other due to the helical shape of the threads of the helix so as to prevent inadvertent removal of the blind rivet from the structural member during handling thereof. When the respective structural member is of a relatively small wall thickness, the outside of the base member of the blind rivet may be provided with pegs to prevent inadvertent removal of the blind rivet from the respective structural member during handling thereof.

According to a further aspect of the invention, the base member of the blind rivet may terminate at one end in a flange provided with a sealing rib which is urged into sealing engagement with the associated structural member during assembly. When the base member of the blind rivet is closed by a bottom at one end thereof, it provides for a fluid-tight threaded joint.

Both the blind rivet and the bolt can be made from plastic material. This results in an all plastic solution which is particularly advantageous with respect to manufacturing costs, weight and recycling.

Other modifications and further developments of the invention are defined in the dependent claims.

BRIEF DESCRIPTION OF THE DRAWINGS

For the purpose of facilitating an understanding of the invention, there is illustrated in the accompanying drawings a preferred embodiment thereof, from an inspection of which when considered in connection with the following description, the invention, its construction and operation, and many of its advantages should be readily understood and appreciated.

FIG. 1 is a side elevational view of a bolt for a threaded joining assembly of the invention;

FIG. 2 is a side elevational view of a nut-like blind rivet of the threaded joining asembly;

FIG. 3 is a longitudinal sectional view, in an enlarged scale, of the blind rivet in FIG. 1;

FIG. 4 is a sectional view in the direction of arrows IV—IV in FIG. 3;

FIG. 5 is a sectional view in the direction of arrows V—V in FIG. 3;

FIG. 7 is a side elevational view, similar to FIG. 2, of a modified embodiment of a blind rivet;

FIG. 8 shows a square mounting hole of one of the structural members to be joined;

FIG. 13 is a top view of the blind rivet in FIG. 2.

DETAILED DESCRIPTION OF THE PREFERRED EMBODIMENTS

Figure 11:
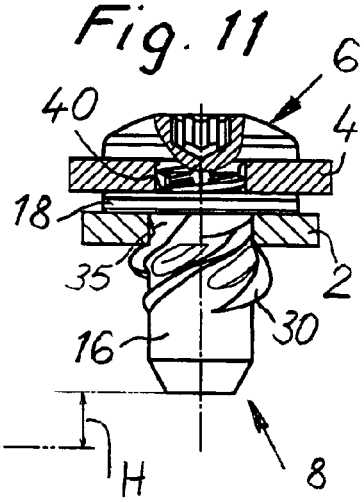
FIG. 11 is a side elevational view of the threaded joining assembly when completely assembled.
Figure 12:
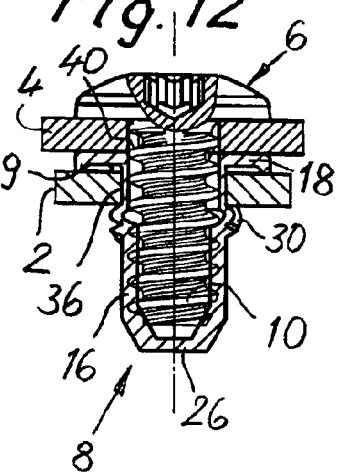
FIG. 12 is a longitudinal section through the threaded joint assembly in FIG. 11.
Figure 10:
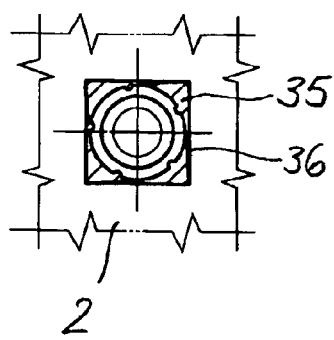
FIG. 10 is a sectional view in the direction of arrows X—X in FIG. 9.

The joining assembly shown in FIGS. 11 and 12 when having been assembled is arranged to join a pair of plate-shaped structural members 2 and 4 which are accessible only from one side thereof, i.e. from the upper side in FIGS. 11 and 12. The structural member 2 may be a sheet of a vehicle body, and the structural member 4 may be a part of a wheel cover of the vehicle. It should be noted, however, that the invention is not limited to this particular application.

The threaded joining assembly includes a bolt 6 which is shown in FIG. 1 as a single part, and a nut-like blind rivet 8 which is shown in FIGS. 2 to 6 as a single part.

As shown in FIG. 1, the bolt 6 is a conventional bolt having a shaft with a thread 10 and a bolt head 12 provided with drive means 14 for rotating the bolt. In the embodiment as shown the bolt 6 is a thread-forming bolt with a right-hand thread and has been made preferably of highly resistant plastic material even though a bolt of metal, e.g. steel, could be used.

The nut-like blind rivet 8 shown in FIGS. 2 to 6 comprises a sleeve-shaped base member 16 having one of its axial ends provided with a flange 18. The flange 18 is provided, at its bottom side, with a sealing lip 19 the purpose of which will be explained later.

The base member 16 has a bore 20 for receiving the bolt 6. The bore 20 comprises a lower bore portion 22 of a smaller diameter and an upper bore portion 24 of greater diameter, which boring portions 22 and 24 are connected to each other by a chamfer. The diameter of the bore portion 22 has been selected such that the thread forming bolt 6 when being threaded into the blind rivet 8 forms a thread in this area. As an alternative, the blind rivet 8 could be provided, in the area of the bore portion 22, with a pre-formed thread for receiving the thread 10 of the bolt 6.

The diameter of the bore portion 24 is substantially the same as the outer diameter of the thread 10 of the bolt 6 so that the bolt 6 may be readily inserted into the bore portion 24. As a result of the increased diameter of the bore portion 24 the blind rivet 8 is of a reduced wall thickness in this area, with the wall thickness being chosen such that the blind rivet 8 may be readily deformed in this area as will be explained in more detail below.

The blind rivet 8 has on its inner side, in the area of the bore portion 24, a plurality of helically extending support ribs 25 (FIGS. 3 to 6). In the embodiment as shown there are provided five support ribs which extend in the right-hand direction and therefore in a direction opposite to that of the thread 10 of the bolt 6. The support ribs 25 extend from a radially inwardly extending annular projection 27 at an end of the flange of the base member 16 to the opposite end of the bore portion 24. The purpose of the support ribs 25 will be explained further below.

The base member 16 is closed by a bottom 26 at its axial end remote from flange 18 so that the bore 20 is closed on this end in a fluid-tight manner. If it is not necessary to provide for fluid tightness of the threaded joining assembly, the respective end of the base member 16 may be open as is the case in the modified embodiment of the blind rivet 8' in FIG. 7.

The base member 16 has its cylindrical outside 28 provided with helix means 30. The helix means 30, in the embodiment as shown, has four threads 32 which extend helically around the cylindrical outside 28 of the base member 16 in an axial range corresponding to that of the bore portion 24 and a part of the bore portion 22. The helix means 30 is in the shape of a right-hand V-shaped thread, i.e. the threads 32 of the helix means 30 are of a triangular profile in an axial section as shown (FIG. 3). The threads 32 of the helix means 30 terminate at their ends remote from flange 18 in chamfers 34 to facilitate insertion of the blind rivet 8 into the mounting hole 36 of the associated structural member 2.

As shown in FIG. 8, the mounting hole 36 of the structural member 2 is of square shape. Therefore, the number of the corners of the mounting holes 36 is the same as the number of the threads 32 of the helix means 30. The dimensions of the mounting hole 36 and of the blind rivet 8 have been chosen such that the length of the peripheral edges of the square mounting hole 36 is substantially similar to the diameter of the cylindrical outside 28 of the base member 16. The outer diameter of the helix means 30 is slightly less than the distance between a pair of diagonally opposite corners of the polygonal mounting hole 36. The profile of the threads of the helix means 30 has been chosen such that they almost completely fill the corners of the square mounting hole 36 after assembly. The lead angle of the helix means 30 exceeds the self-locking angle; preferably it is in the range from 50° to 60°, preferably it is about 55°.

Figure 6:
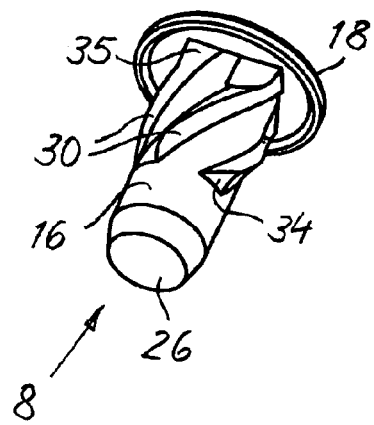
FIG. 6 is a perspective view of the blind rivet in FIG. 2.

As may be seen in particular in FIGS. 4 and 6, the threads 32 of the helix means 30 have their ends adjacent flange 18 merge into body portions 35 of increased cross-section. The body portions 35 of increased cross-section are formed, on the one hand, by a radial increase of the helix threads 32 themselves and, on the other hand, by additional material between the helix threads, such that the body portion 35 has a peripheral surface 37 of a cross-section the shape of which corresponds to the shape of the polygonal mounting hole 36. In the embodiment as shown the body portion 35 adjacent flange 18 (a long section IV—IV, see FIGS. 3, 4) is of a substantially square cross-section which is matingly received by the square mounting hole 36 of the structural member 2 after assembly as will explained in more detail below.

The integral one-piece blind rivet 8 is preferably made of a plastic material so that the bolt 6 and the blind rivet 8 provide for a recyclable all plastic material solution. An impact resistant polyamid or another impact resistant plastic material, an elostomeric plastic material, or rubber may be used. In any case the material must be chosen so as to be sufficiently resiliently deformable in order to enable folding of the blind rivet 8 (still to be described) and to provide for sufficient strength of the joint of the two structural members 2, 4.

With reference to FIGS. 9 to 12, the process of assembling the above discussed joint assembly will now be explained. For joining the blind rivet 8 to the lower structural member 2 the blind rivet 8 is inserted axially into the square mounting hole 36 of the structural member 2 (see FIG. 9). The chamfers 34 at the ends of the threads 32 of the helix means 30 facilitate such insertion step. When the blind rivet 8 is axially urged into the mounting hole 36, the blind rivet 8, due to the great lead angle of the four threads of the helix means 30, performs a right-hand rotary movement until the flange 18 engages upon the upper surface of the structural member 2. As a result the square body portion 35 at the upper end of the helix means 30 will be matingly received from the square mounting hole 36 of the structural member 2 so that the blind rivet 8 is prevented from rotary movements within the structural member 2.

Since the internal surfaces of the square mounting hole 36 are not adapted to the helical shape of the threads 32 of the helix means 30, there will be a slight self-locking action between the helix means 30 and the peripheral surface of the mounting hole 36, with the self-locking action being dependent on the thickness of the plate-like structural member 2. The thickness of the structural member 2 may be for example in the range from 0.8 to 2.5 mm. At this point of the description it is to be noted that the joint assembly needs not be adapted to a specific thickness of the plate-like structural members but is suited for a substantial range of varying thicknesses of the structural members.

Figure 9:
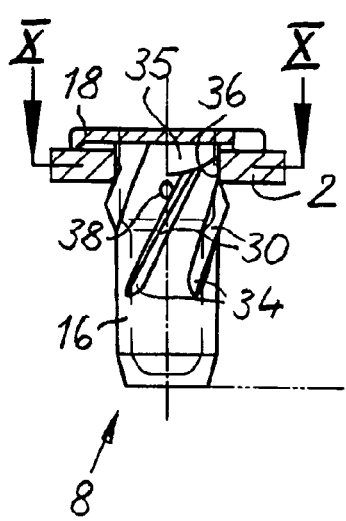
FIG. 9 is a side elevational view, similar to FIG. 2, of the blind rivet when initially inserted into the associated structural member during assembly.

As may be seen in FIGS. 2, 6 and 9, pegs 38 may be provided on the outer surface 28 of the base member, which pegs are intended to prevent inadvertent disassembly of the blind rivet from structural member 2 during handling thereof, in particular if the structural member 2 is of a relatively small thickness.

The upper structural member 4 will now be positioned upon the flange 18 of the blind rivet 8 such that a mounting hole 40 of the structural member 4 will be aligned to the bore 20 of the blind rivet 8. The mounting hole 40 of the structural member 4 is circular and of a diameter which is similar to the outer diameter of the thread 10 of the bolt 6. Therefore, the bolt 6 may be readily inserted, through the mounting hole 40, into the bore 20 of the blind rivet 8 and may be threadingly engaged to the blind rivet 8. As already mentioned above, the thread 10 of the bolt 6 forms a corresponding thread in the wall of the base member 16 in the area of the bore portion 22.

When the bolt 6 is screwed into the blind rivet 8, the lower portion of the base member 16 (in the area of the bore portion 22) is drawn upwards for a distance H against the bottom side of the structural member 2, see FIG. 11. As a result the thin portion of the base member 16 and the threads 32 of the helix means 30 are folded in the area of the bore portion 22 such that the respective flanks of the helix means 30 are slightly deformed in the right-hand direction so as to be urged against the bottom side of the structural member 2. The respective flanks of the helix means 30 partially engage the structural member 2 so that the joint between the structural members 2 and 4 is completed.

In order to enable such folding operation-the wall thickness of the base member 16 in the area of the bore portion 24 will be selected so as to be relatively small. The resulting free space between the outer periphery of the thread 10 of the bolt 6 and the internal wall of the bore portion 24 is bridged by the support ribs 25 which are of a (left-hand) lead opposite to the lead of the thread 10 of the bolt 6. Since the support ribs 25 do not extend axially but rather obliquely with respect to the axial direction, they freely yield or buckle in an axial direction during the folding operation; however they prevent the material of the blind rivet 6 from radially yielding inwards due to their engagement at the outer periphery of the threads 10 of the bolt 6. Furthermore, they urge the outer surface of the body portion 35 at the end of the helix means 30 into engagement with the peripheral surface of the mounting hole 36 of the structural member 2.

The resulting positive engagement between the body portion 35 and the mounting hole 36 prevents the blind rivet 8 from being rotated during assembly, both during the process of forming the thread within the bore portion 22 of the blind rivet 8 as well as during the folding operation. More precisely during such assembling operations the surface portions 37a of the peripheral surface 37 of the body portion 35 and the respective surface portions of the mounting holes 36 will fully engage each other (see FIG. 4) so as to take up the torque resulting from the right-hand rotational movement of the bolt 6 by sufficient surface contact. Since the surface portions 37b adjacent to the surface portions 37a do not perform any torque transmitting function, they may be slightly recessed as shown in FIG. 4 which facilitates removal of the blind rivet from an injection molding die during injection molding of the blind rivet.

The threading and folding operation may be terminated by the bolt 6 engaging the bottom 26 of the blind rivet 8. As an alternative the torque exerted upon the bolt 6 when threaded into the blind rivet 8 may be limited so that the threading operation will be terminated by reaching a torque limit when the bolt head 12 will have engaged the structural member 4. This allows the joint assembly as described to be used for plate-like structural members of varying thicknesses.

In the assembled condition the sealing lip 19 of the flange 18 of the blind rivet 8 is urged against the top surface of the structural member 2 so as to provide for a fluid-tight seal with respect to the environment. Since, furthermore, the lower end of the blind rivet 8 is closed by the bottom 26, the joint assembly is waterproof.

In the embodiment as described the helix means 30 has four threads and the mounting hole 36 is of square shape. It should be noted, however, that the number of the threads of the helix means 30 and the numbers of the corners of the mounting hole 36 may be different; for example three, five or six threads of the helix means and, respectively, corners of the polygon are possible. Furthermore, while in the embodiment as described the thread 10 of the bolt 6 and the helix means 30 of the blind rivet 8 comprise right-hand threads and the support ribs 25 within the blind rivet 8 comprise left-hand threads, the arrangement could be the other way around.

We claim:
1. A joining assembly for joining a pair of structural members, which joining assembly comprises a bolt having a thread and a nut-like blind rivet, said bolt and said nut-like blind rivet being adapted to be inserted into mounting holes of said pair of structural members and to be threadingly engaged to each other, one of said mounting holes of said pair of structural members being formed as a polygonal mounting hole, said blind rivet being made of a resiliently deformable material and comprising a base member including a bore for receiving the thread of said bolt and having a closed outside provided with a helix means comprising a plurality of threads which are the same in number to the corners of said polygonal mounting hole and which are of an outer diameter substantially similar to the distance between two diagonally opposite corners of said polygonal mounting hole, such that when said bolt is threadingly engaged into said bore of said blind rivet said base member and said helix means are folded whereby the said plurality of threads of said helix means have parts of their flanks pressed against one of said structural members.

2. The joining assembly of claim 1, wherein said base member has a cylindrical wall of a defined wall thickness and a defined outer diameter, and said polygonal mounting hole has lateral edges of a length similar to the outer diameter of said cylindrical wall of said base member.

3. The joining assembly of claim 2, wherein the bore of said base member comprises a bore portion of smaller diameter for threaded engagement to said bolt, and a bore portion of a greater diameter and reduced wall thickness to enable folding of said base member and said helix means.

4. The joining assembly of claim 3, wherein the thread of said bolt has a crest and said bore portion of greater diameter has an internal side provided with a plurality of helically extending support ribs which engage the crest of the thread of said bolt.

5. The joining assembly of claim 1, wherein said helix means comprises V-shaped threads.

6. The joining assembly of claim 5, wherein the V-shaped threads of said helix means have a profile matingly shaped to conform to the corners of said polygonal mounting hole.

7. The joining assembly of claim 1, wherein said helix means has a lead angle exceeding a self-locking angle of said helix means.

8. The joining assembly of claim 1, wherein said helix means comprises four threads and said polygonal mounting hole is of square shape.

9. The joining assembly of claim 1, wherein said plurality of threads of said helix means each terminate in a chamfer for facilitating insertion of the blind rivet into said polygonal mounting hole.

10. The joining assembly of claim 1, wherein said base member of said blind rivet has an end provided with a flange sandwiched between said structural members when assembled and being provided with a sealing lip on one side thereof.

11. The joining assembly of claim 10, wherein gaps are provided between said plurality of threads of said helix means, said plurality of threads terminate adjacent said flange in body portions of increased cross-section to fill said gaps, said body portions having outer surfaces which are matingly shaped to conform substantially to the cross-sectional shape of said polygonal mounting hole.

12. The joining assembly of claim 1, wherein the base member of said blind rivet is closed by a bottom at an end remote from said pair of structural members.

13. The joining assembly of claim 1, wherein the base member of the blind rivet is open at an end remote from said pair of structural members.

14. The joining assembly of claim 1, wherein the mounting hole of another of said pair of structural members is of circular shape and has a diameter similar to the outer diameter of the thread of said bolt.

15. The joining assembly of claim 1, wherein the base member of said blind rivet has an outside provided with pegs for preventing inadvertent removal of said bolt prior to assembly thereof.

16. The joining assembly of claim 1, wherein said bolt is a thread-forming bolt which when threadingly engaged into a smooth bore section of the bore of said base member of said blind nut forms a mating thread.

17. The joining assembly of claim 1, wherein the bore of the base member of said blind nut has a pre-formed thread mating the thread of said bolt.

18. The joining assembly of claim 1, wherein said bolt is made from plastic material or metal.

19. The joining assembly of claim 1, wherein said blind rivet is made of an impact resistant polyamid or another impact resistant plastic material.

20. The joining assembly of claim 1, wherein said blind nut is made of an elastomeric plastic material or rubber.

* * * * *